United States Patent [19]
Marshall

[11] Patent Number: 5,251,487
[45] Date of Patent: Oct. 12, 1993

[54] APPARATUS FOR ACOUSTICALLY COUPLING AN ULTRASONIC TRANSDUCER WITH A BODY

[75] Inventor: Scot H. Marshall, Slidell, La.
[73] Assignee: Martin Marietta Corporation, Bethesda, Md.
[21] Appl. No.: 776,845
[22] Filed: Oct. 15, 1991

Related U.S. Application Data

[62] Division of Ser. No. 329,939, Mar. 29, 1989, Pat. No. 5,056,367.

[51] Int. Cl.$^5$ ............................................. G01N 29/00
[52] U.S. Cl. ................................................... 73/644
[58] Field of Search ................. 73/644, 632, 641, 642, 73/637, 638, 633; 310/313 R

[56] References Cited

U.S. PATENT DOCUMENTS

| | | | |
|---|---|---|---|
| 2,602,101 | 7/1952 | Mesh | 73/633 |
| 2,602,102 | 7/1952 | Webb | 73/633 |
| 2,912,854 | 11/1959 | Schubring | 73/644 |
| 3,299,696 | 1/1967 | Dickinson, III . | |
| 3,546,924 | 12/1970 | Nussbaum et al. | 73/644 |
| 3,720,098 | 3/1973 | Dixon | 73/597 |
| 3,896,662 | 7/1975 | Camp et al. . | |
| 4,049,954 | 9/1977 | Da Costa Vieira et al. . | |
| 4,234,942 | 11/1980 | Prause et al. | 367/128 |
| 4,313,070 | 1/1982 | Fisher | 73/644 |
| 4,386,527 | 6/1983 | Maucher | 73/597 |
| 4,398,421 | 8/1983 | White | 73/644 |
| 4,462,256 | 7/1984 | Moffett | 73/642 |
| 4,539,847 | 9/1985 | Paap | 73/579 |
| 4,567,747 | 2/1986 | Matay | 73/1 DV |
| 4,630,226 | 12/1986 | Tanaka | 364/560 |
| 4,712,428 | 12/1987 | Ishii et al. | 73/644 |

FOREIGN PATENT DOCUMENTS 54-99665 8/1979 Japan .................................... 73/622

OTHER PUBLICATIONS

Igor Aleksandrovich Viktorov, *Rayleigh and Lamb Waves*, (Plenum Press: New York), 1967, pp. 1, 67, 92 and 93.
J. Krautkramer et al., *Ultrasonic Testing of Materials*, Springer-Verlag, NY, 1983, pp. 228-235.
J. Krautkramer et al., *Ultrasonic Testing of Materials*, Springer-Verlag, N.Y., 1983, p. 422.

*Primary Examiner*—John E. Chapman
*Attorney, Agent, or Firm*—Pravel, Hewitt, Kimball & Krieger

[57] ABSTRACT

An apparatus for acoustically coupling an ultrasonic transducer with a body along whose surface waves are to be transmitted includes a wedge having a first surface for acoustically contacting a subject surface area of a body to be measured, on which surface waves are to be transmitted, and a second surface for acoustically contacting an ultrasonic transducer. The wedge includes a cylinder in which the second surface is present and which is movably disposed in a recess in a block in which the first surface is present, for orienting the first surface and the second surface relative to each other so that ultrasonic waves emitted by the ultrasonic transducer generate surface waves which travel on the subject surface area of the body when the ultrasonic transducer is in acoustic contact with the second surface and the first surface is in acoustic contact with the subject surface area of the body. In the preferred embodiment, there is a third surface which is orientable relative to the first surface so that ultrasonic waves emitted by an ultrasonic transucer in contact with the third surface generate surface waves which travel on the subject surface area of the body when the first surface is an acoustic contact with the subject surface area of the body.

5 Claims, 10 Drawing Sheets

APPARATUS FOR ACOUSTICALLY COUPLING AN ULTRASONIC TRANSDUCER WITH A BODY

The invention described herein was made in the performance of work under NASA Contract No. NAS 8-33708, and is subject to the provisions of Section 305 of the National Aeronautics and Space Act of 1958, as amended (42 U.S.C. 2457). NASA signed a patent waiver (NASA Patent Waiver W-2697, NASA Case MFS-28, 266-1) for the invention on Sep. 26, 1988.

This is a division of copending application Ser. No. 07/329,939, filed Mar. 29, 1989, now U.S. Pat. No. 5,056,367.

BACKGROUND OF THE INVENTION

1. Field of the Invention

The invention relates to measuring apparatus, and more particularly to length measuring apparatus.

2. General Background

Figure 1:
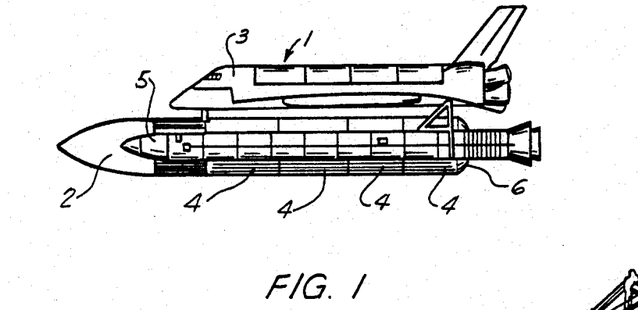
FIG. 1 is a side view of a Space Shuttle System comprised of an orbiter 3 mated to an External Tank 2 to which two solid rocket motors 5 (one shown, one opposite) are attached.
Figure 2:
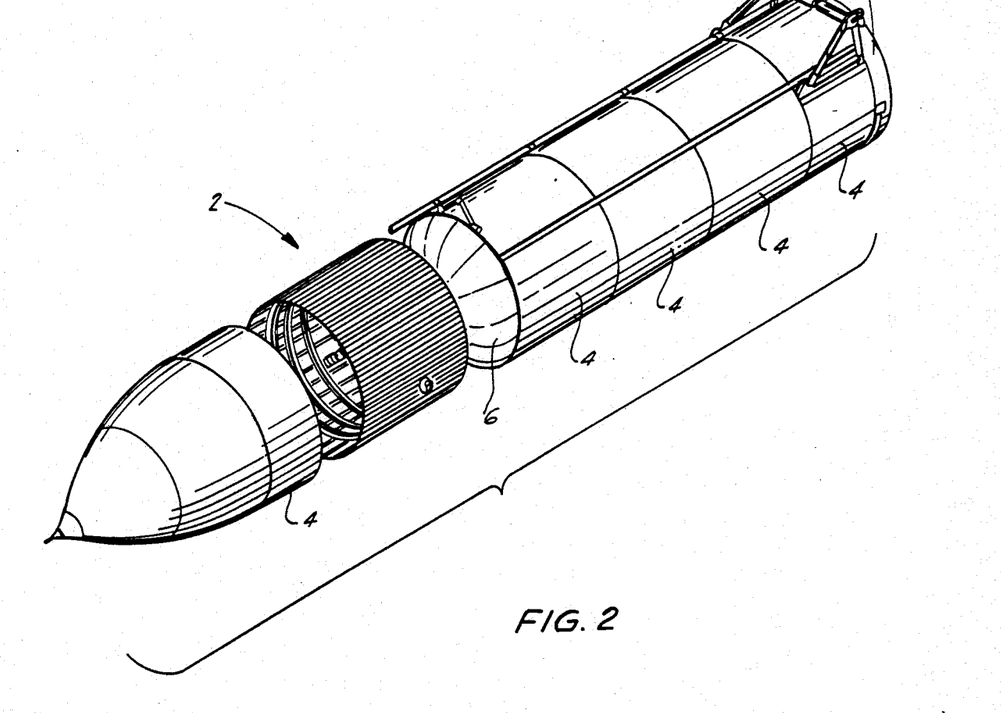
FIG. 2 is an exploded view of the external tank shown in FIG. 1.

The External Tank 2 (FIGS. 1 and 2) of the Space Shuttle System 1 is a very large cryogenic tank with a relatively thin wall. Tank 2 is generally made of welded aluminum (2219) and is nominally 331.000 inches in diameter (86.656 feet or 1,039.867 inches in circumference). The wall of tank 2 is nominally 0.200 inches thick (⅒% of the thickness of its diameter). If tank 2 were reduced proportionally so that its diameter were equal to that of a soft drink can, the tank 2 wall would be one half the thickness of the soft drink can wall. External Tank 2 comprises a number of cylindrical barrel sections 4 and dome structures 6 which are welded together. Because of the thinness of the wall, the perimeters of two barrel sections 4 which are to be welded together must manufactured within close tolerance (±0.02 percent). If not, the out-of-tolerance section 4 may have to be discarded, which is a very expensive proposition.

The current method of perimeter measurement of tanks such as tank 2 involves using a steel tape. The steel tape is pulled with constant tension around the surface to be measured. Care is taken to ensure that the tape remains in the same measurement plane. The temperature is determined using a hand-held surface probe. Several measurements of the surface temperature are taken and averaged to determine the nominal temperature. The measurement is then corrected to account for the difference between the nominal temperature and some reference temperature. It normally takes approximately one hour to perform the steps necessary to obtain one measurement. Anomalies in the steel tape used for the measurement and defects in the surface to be measured can adversely affect the measurement. Since the measurement is technique-dependent, it is difficult to maintain a high degree of repeatability without significant training. Thus, using a steel tape, it is difficult to obtain a repeatable and accurate measurement of the perimeter of an External Tank section 4.

SUMMARY OF THE INVENTION

The present invention comprises a system for using ultrasonic waves to make linear measurements. The system is particularly useful for making perimeter measurements of curvilinear surfaces, but can also be used to make linear measurements of plane surfaces. Moreover, the system can be used to make linear measurements where the use of conventional measuring means would be extremely difficult or even impossible. It can measure perimeters having lengths of more than 1000 inches, as well as shorter lengths. In piecewise fashion, it may be used to measure unlimited distances. It may also be used to determine discontinuities of surfaces of known dimension.

BRIEF DESCRIPTION OF THE DRAWINGS.

For a further understanding of the nature, objects, and advantages of the present invention, reference should be made to the following detailed description, taken in conjunction with the accompanying drawings, in which like reference numerals denote like elements, and wherein.

DETAILED DESCRIPTION OF THE PREFERRED EMBODIMENTS

Figure 3:
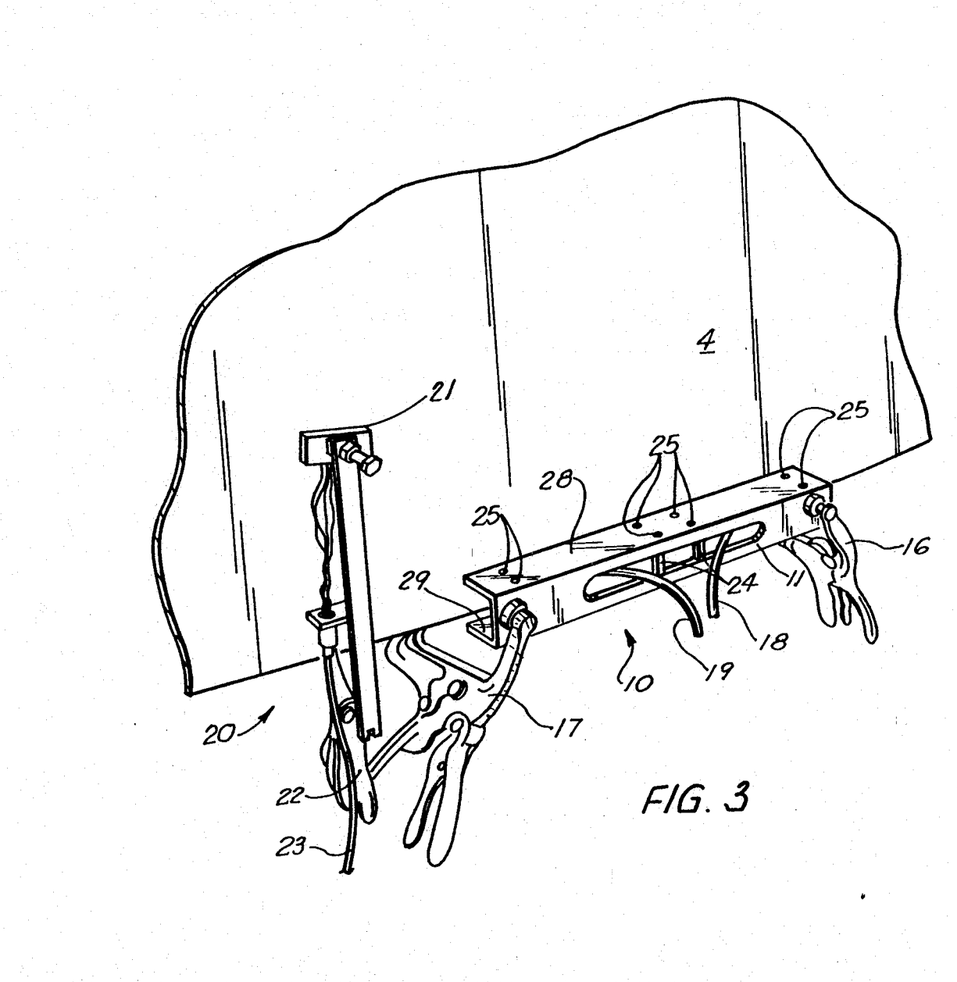
FIG. 3 is a perspective view of sensor assemblies of the present invention attached to a section of the external tank.
Figure 4:
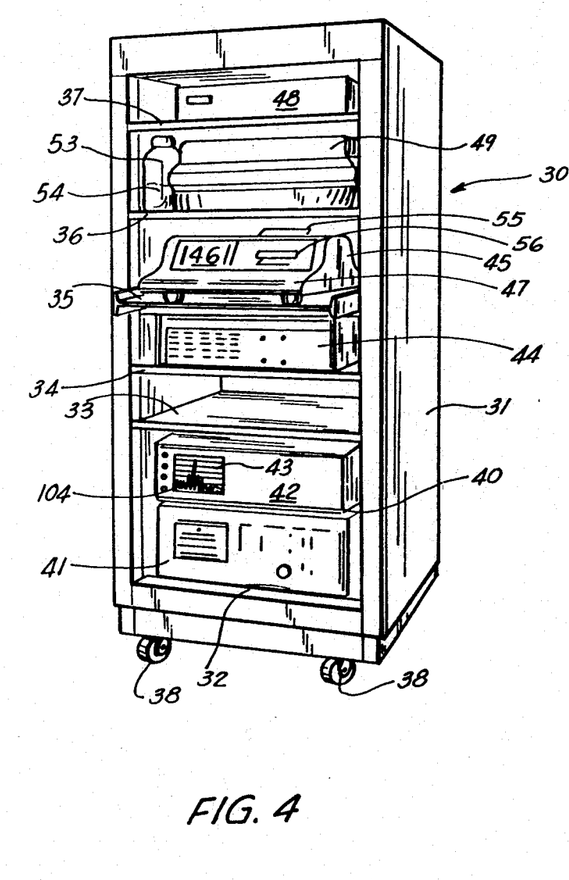
FIG. 4 is a perspective view of a cabinet housing electronic equipment in accordance with the present invention.

A preferred embodiment of the present invention is a portable ultrasonic linear measurement system comprising a portable ultrasonic sensor assembly 10 (FIG. 3), a portable temperature sensor assembly 20, and a portable data/signal processing assembly 30 (FIG. 4). Multiple systems may be used concurrently to make a multiplicity of simultaneous measurements in various dimensions.

The portable data processing assembly 30 (see FIG. 4) comprises of a portable cabinet 31 having shelves 32–37 and four wheels 38 (only two of which are shown in FIG. 4) and containing all data/signal processing equipment. For example, an ultrasonic transceiver 40 sits on shelf 32. Ultrasonic transceiver 40 comprises a mainframe 41 and a display chassis 42 having a display screen 43, the purpose of which will be described below. A timer 44 sits on shelf 34. A computer 45, including data storage 56, a printer 55, a display 46 and a keyboard 47, sits on shelf 35, which slides out of cabinet 31 to make access to the computer 45 and keyboard 47 easier. A data acquisition unit 48 for temperature measurement sits on shelf 37. One or more of components 40, 44, 45, and 48 may be combined into a single, more compact device.

Portable ultrasonic sensor assembly 10 comprises a sensor housing 11 in which ultrasonic wedges 12 and 13 (see FIG. 10) are disposed. Sensor housing 11 comprises sections (for example, two sections 28 and 29) which are individually or collectively adjustable with respect to one another. Sections 28 and 29 have holes and slots, respectively (not shown in the drawings), through which bolts 26 and 27 pass, securing housing 11 to clamps 16 and 17. Wedges may be temporarily or permanently affixed to each housing by various means (for example, adhering, clamping, screwing) and disposed at various angles relative to each other including 0°. For example, screws 25 may extend through holes in sections 29 and 28 and internally threaded spacers 24 extend between vertically aligned screws 25. Wedges 13 and 12 are placed between or affixed to sections 28 and 29 of housing 11, and threaded cylinders 24 are rotated in a direction which draws sections 28 and 29 together, clamping wedges 12 and 13 therebetween, thereby fixing the positioning of wedges 12 and 13 180° relative to one another.

Ultrasonic wedges 12 and 13 each comprise a wedge 50 (shown in more detail in FIG. 5) having a first surface 51 for acoustically contacting a subject surface area of a body to be measured and a second surface 52 for acoustically contacting an ultrasonic transducer. An ultrasonic transducer 14 acoustically contacts second surface 52 of ultrasonic wedge 12 and an ultrasonic transducer 15 acoustically contacts second surface 52 of ultrasonc wedge 13.

Figures 5, 6:
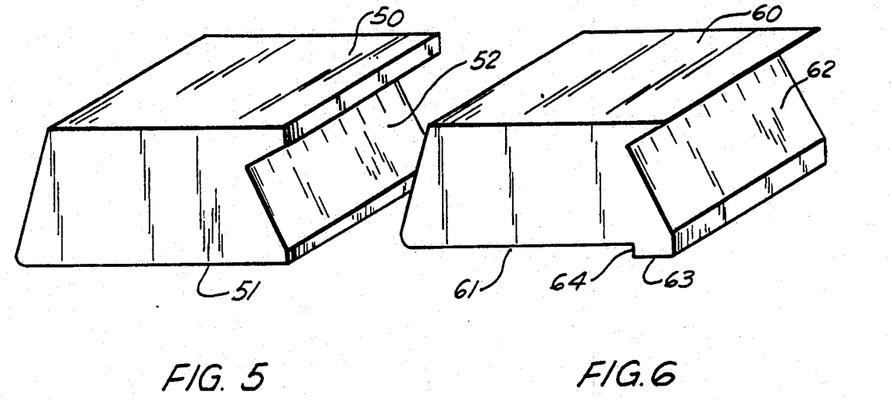
FIG. 5 is a perspective view of a wedge which is shown in use in FIG. 10.
FIG. 6 is a perspective view of a wedge which is similar to that shown in FIG. 5.

Surfaces 51 and 52 are relatively oriented such that ultrasonic waves emitted or received by ultrasonic transducer 14, when it is in acoustic contact with surface 52 of wedge 12, generate or detect surface waves which travel on the surface of a body when surface 51 is in acoustic contact with the surface of the body. Wedges 12 and 13 are relatively oriented such that ultrasonic waves emitted by transducer 15, when it is in acoustic contact with surface 52 of wedge 13, generate surface waves which travel on the surface of a body in a desired direction relative to (such as opposite to) that of surface waves generated by transducer 14 when it is in acoustic contact with surface 52 of wedge 12.

Figure 10:
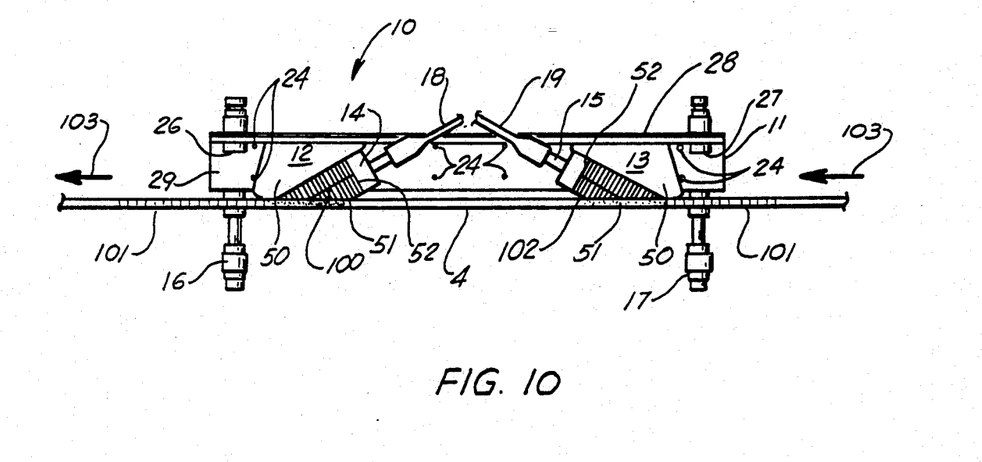
FIG. 10 is a sectional view of the system shown in FIG. 3.

Clamps 16 and 17 apply pressure between housing 11 and the wall of tank section 4, clamping wedges 12 and 13 between housing 11 and the wall of tank section 4. There is preferably a coupling fluid between first surfaces 51 of wedges 12 and 13 and the wall of tank section 4 to ensure that surfaces 51 acoustically contact the wall of tank section 4. There is also preferably a coupling fluid between second surfaces 52 and ultrasonic transducers 14 and 15 to ensure that the transducers 14 and 15 and the wedges 12 and 13, respectively, remain in acoustic contact with each other. Cables 18 and 19 connect ultrasonic transducers 14 and 15, respectively, to ultrasonic transceiver 40.

Portable temperature sensor assembly 20 (FIG. 3) comprises a temperature sensor 21 and a toggle clamp 22, which serves as a means for maintaining the temperature sensor in thermal contact with a structure whose temperature . is to be monitored, which, in FIG. 3, is the wall of tank section 4. A cable 23 interconnects temperature sensor 21 and data acquisition unit 48. Temperature sensor 21 is preferably a responsive, sensitive, high accuracy device such as a platinum resistance temperature device (of suitable durability). There may be many such assemblies 20. Nominally there are four assemblies used for most measurements.

FIG. 6 shows an alternative embodiment of a wedge in accordance with the present invention. Wedge 60 has a first surface 61 for acoustically contacting a subject surface area of a body to be measured and a second surface 62 for acoustically contacting a transducer, such as transducer 14 or 15. Wedge 60 also has a heel 63 projecting perpendicularly outward from adjacent first surface 61. Heel 63 has a surface 64 which abuts against an end of a body whose length is to be measured. Heel 63 acts as a means for assisting in the orientation of wedge 60 relative to the surface of the body. Wedge 60 can be used to determine the length of finite length surfaces, such as semicylinders or plates. The operation of wedge 60 will be described below.

Figure 8:
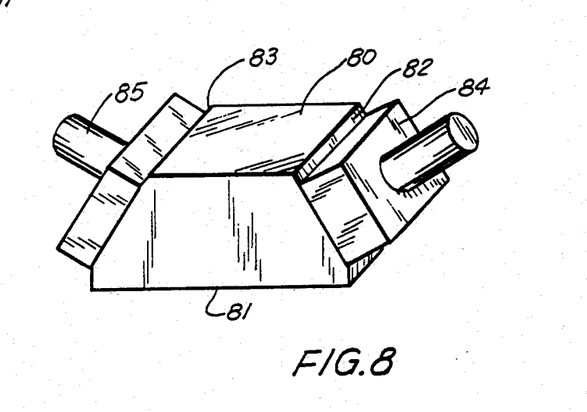
FIG. 8 is a perspective view of another wedge in accordance with the present invention.

Wedge 80, shown in FIG. 8, is another embodiment of a wedge in accordance with the present invention. Wedge 80 has a first surface 81 for acoustically contacting a subject surface area of a body to be measured, second surface 82 for acoustically contacting an ultrasonic transducer 84, and a third surface 83 for acoustically contacting an ultrasonic transducer 85.

Surfaces 81 and 82 are relatively oriented such that ultrasonic waves emitted or received by ultrasonic transducer 84, when it is in acoustic contact with surface 82, generate or detect surface waves which travel on the surface of a body when surface 81 is in acoustic contact with the surface of the body. Surfaces 81 and 83 are relatively oriented such that ultrasonic waves emitted by transducer 85, when it is in acoustic contact with surface 83, generate surface waves which travel on the surface of a body in a desired direction relative to (such as opposite to) that of surface waves generated by transducer 84 when it is in acoustic contact with surface 82.

Figure 7:
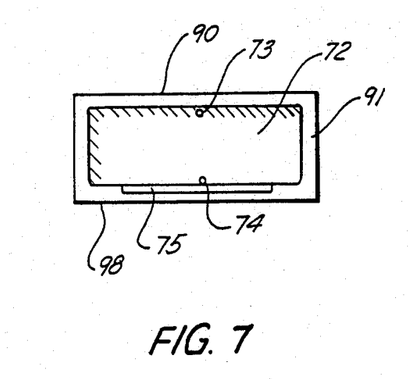
FIG. 7 is a bottom view of a wedge which is shown in FIG. 9 in accordance with the present invention.
Figure 9:
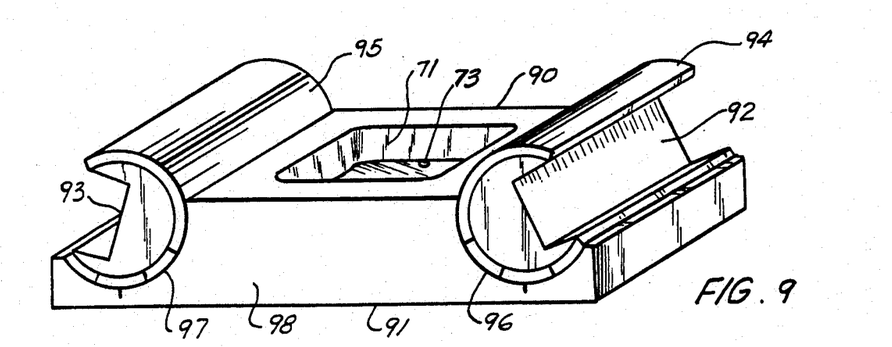
FIG. 9 is a perspective view of another wedge in accordance with the present invention.

Another embodiment of a wedge in accordance with the present invention, wedge 90, is shown in FIGS. 7 and 9. Wedge 90 comprises a block 98 having a first surface 91, a recessed transmission chamber 72, a reservoir 71, a vent 75, and fluid passageways 73 and 74 providing fluid communication between reservoir 71 and recessed transmission chamber 72. Vent 75 is recessed further into block 98 than is recessed transmission chamber 72, and provides a means for allowing air bubbles to escape from recessed transmission chamber 72 through passageway 74. Reservoir 71, vent 75, and fluid passageways 73 and 74 may be recessed in any surface as may be advantageous, based on the desired orientation of block 98 with respect to gravity. A cover plate or cap for reservoir 71 may be added.

When wedge 90 is to be used on rough surfaces, rubber or other sealing means may be provided on surface 91 to maintain couplant within the area of wedge 90.

Wedges 80 or 90 may additionally comprise a heel, such as heel 63, or other means of edge reference. Recessed transmission chamber 72 may be omitted from wedge 90. Wedges 50, 60, 80, 90 may include certain characteristics as described in any of the other wedges as the application requires.

Block 98 has disposed therein recesses 96 and 97 in which are disposed cylinders 94 and 95, respectively. Cylinders 94 and 95 are capable of being indexed with respect to block 98. A second surface 92 of wedge 90 is present on cylinder 94 and a third surface 93 of wedge 90 is present on cylinder 95. Cylinder 94 and recess 96 act as a means for relatively orienting first surface 91 and second surface 92, and cylinder 95 and recess 97 act as a means for relatively orienting first surface 91 and third surface 93. Surfaces 92 and 93 may be oriented with respect to surface 91, at any angle between some minimum and maximum.

Wedges 50, 60, 80, and 90 preferably are made of acoustic grade clear acrylic plastic, a material well-known in the industry and often used for acoustic wedges.

Figure 13:
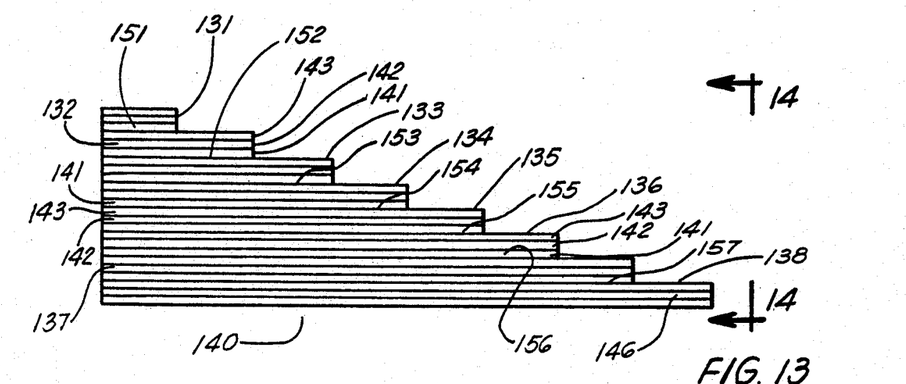
FIG. 13 is a plan view of a reference standard in accordance with the present invention.
Figure 14:
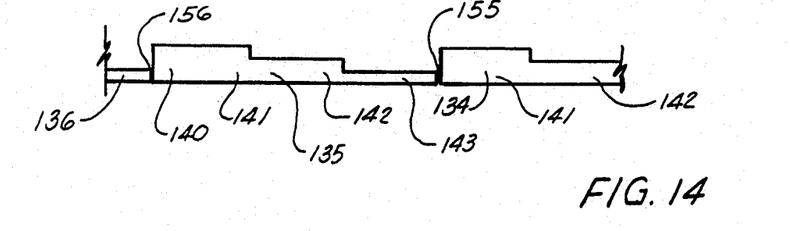
FIG. 14 is an end view taken along lines 14–14 of FIG. 13.

FIGS. 13 and 14 show a reference standard 140. Reference standard 140 comprises a number of reference lengths 131-138. Each reference length comprises three reference thicknesses 141, 142, and 143. Each reference length 131-137 also comprises an acoustic barrier (151-157) whereby a slot is cut between a reference length 131-137 and the reference length (132-138) adjacent it. Acoustic barriers 151-157 may be cut at either end of reference standard 140. It may also be cut at both ends of the reference standard as required for directionality. By way of example, reference standard 140 could have a total length of 130.000 inches (½scale), each barrier 152-157 having a length of 16.250 inches, barrier 151 having a length of 8.125 inches, and each reference length differing from the previous length by 32.500 inches, each thickness 141, 142, and 143 having a width of 2.000 inches with thickness 143 having a reduced width of 1.900 inches on each length 132-138 along and beyond acoustic barriers 151-157, each thickness 141 having a height of 0.500 inches, each thickness 142 having a height of 0.320 inches, and each step 143 having a height of 0.200 inches. One could provide a reference standard whose dimensions are well known, and of relative scale to, and constructed of the same material as an object whose length or perimeter is to be measured. The velocity of acoustic waves in the material can be determined by using the measuring apparatus of the present invention to measure the amount of time it takes the acoustic waves to traverse these dimensions. The velocity thus determined can be used to determine the length or perimeter of the object to be measured.

Figure 15A:
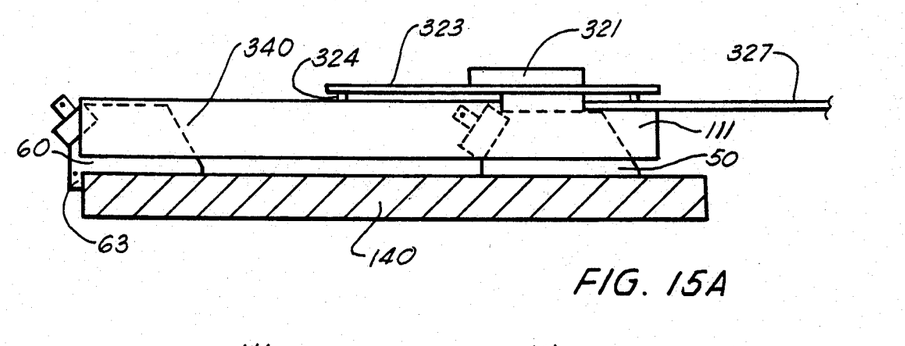
FIG. 15A is a side view of a sensor assembly in accordance with the present invention.
Figure 15B:
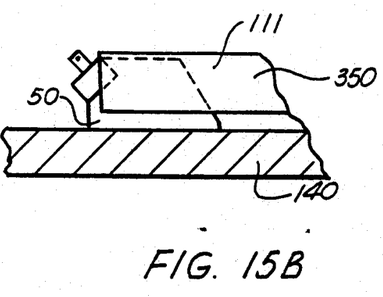
FIG. 15B is a side view of a sensor assembly in accordance with an alternative embodiment of the present invention.
Figure 15C:
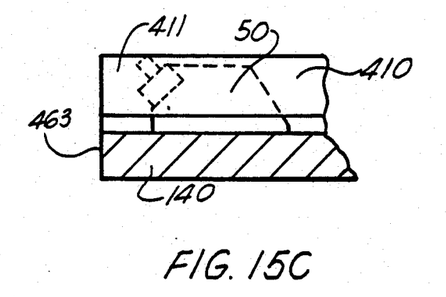
FIG. 15C is a side view of a sensor assembly in accordance with another alternative embodiment of the present invention.
Figure 15D:
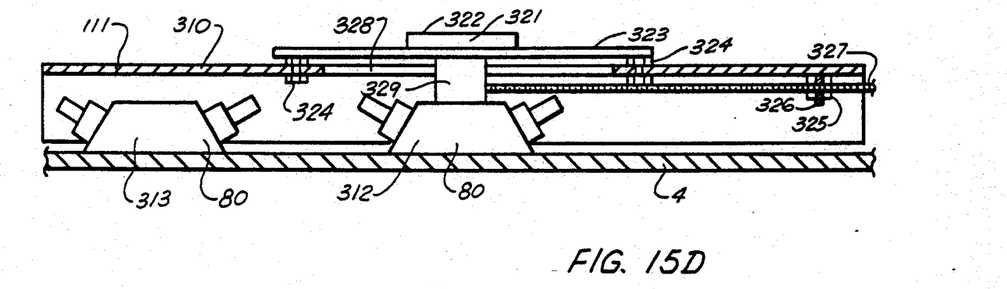
FIG. 15D is a sectional view of a sensor assembly in accordance with yet another alternative embodiment of the present invention.

FIG. 15D shows a sensor assembly 310 comprising a sensor housing 111 and two wedges 312 and 313, which comprise wedges 80. Bolts 324 affix a calibrated caliper 323 to sensor housing 111. Wedge 313 is affixedly attached to housing 111. Wedge 312 is attached to caliper head 321 by spacer 329, which extends through a slot 328 in housing 111. Caliper head 321 has a display 322 on the top thereof. Means for manual or automatic vernier adjustment of the position of wedge 312 is provided. For example, a threaded rod 327 may be threadedly disposed in a nut 325 affixedly attached to guide 326 from housing 111, and is rotatably attached to spacer 329. Movement of caliper head 321 along caliper 323 and tank section 4 may be effected by rotating rod 327. Caliper head 321 also comprises an automatic position-sensing means which detects the position of wedge 312 and displays the position on display 322. It may also send position information to computer 45. Wedges 90 could be substituted for wedges 80.

Sensor assembly 340 (FIG. 15A) is similar to sensor assembly 310, except that wedge 313 is replaced with wedge 60, and wedge 312 is replaced with wedge 50.

Sensor assembly 350 (FIG. 15B) is similar to sensor assembly 310, except that wedge 50 replaces wedge 313.

Sensor assembly 410 is similar to sensor assembly 350, and sensor housing 411 is similar to sensor housing 111. Sensor housing 411 additionally comprises a heel 463 for referencing housing 411 against the end of an object to be measured.

Figure 24:
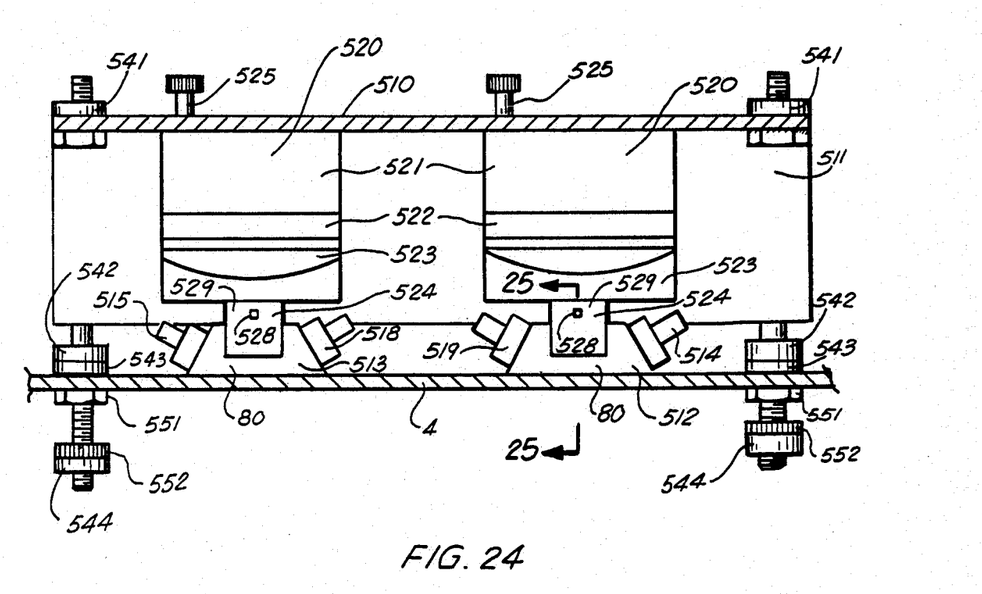
FIG. 24 is a sectional view of the preferred embodiment of the sensor assembly of the present invention.
Figures 25, 26:
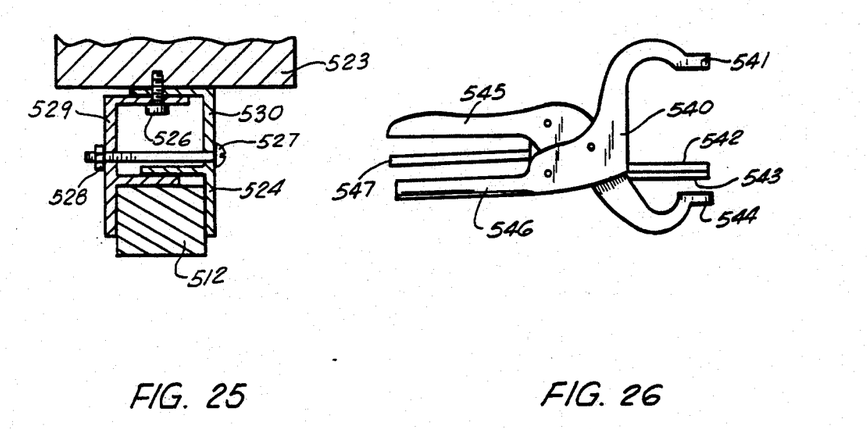
FIG. 25 is a detail thereof.
FIG. 26 is a view of a clamp used with the sensor assembly shown in FIG. 24.

The preferred embodiment of the sensor assembly of the present invention, assembly 510 (FIG. 24), comprises a sensor housing 511 and wedges 512 and 513. While wedges 80 are shown as wedges 512 and 513, they could be replaced by any of the above-mentioned wedges. Sensor housing 511 is positioned on the surface of tank section 4 by gravity or mechanical means such as clamps 540 (FIG. 26) which comprise two jaws 541 and 544, a tongue 542, release mechanism 547, and handles 545 and 546. An ablative material such as polytetrafluoroethylene (PTFE) spacer 543 prevents tongue 542 from coming into contact with and damaging tank section 4. A PTFE bolt 551 and hand-adjustable nut 552 adjustably space jaw 544 from tank section 4. Jaw 541 is attached to housing 511 A positioning assembly 520 comprises means for optimizing the angle between the transducers 514, 515, 518, and 519 and tank section 4 and means for relatively orientating the axes of wedges 512 and 513, for example, the X, Z, and Z-rotation axes. There may be a Z-translation stage 521, an X-translation stage 522, a goniometer 523 and a wedge attachment means 524 attached to each of wedges 512 and 513. Wedge attachment means 524 (FIG. 25) comprises two brackets 529 and 530 joined by a screw 527 and a nut 528 which adjust their lateral displacement. A screw 526 secures brackets 529 and 530 to the base of goniometer 523. Hand-adjustable screws 525 (some not shown) rotate/translate positioning assembly 520 in housing 511.

When the ultrasonic linear measurement system of the present invention is not in use, ultrasonic transducers 14 and 15 and wedges 50, 60, 80, and 90 may be stored in a transducer case 49 on shelf 36 of portable cabinet 31, and the remainder of ultrasonic sensor assemblies 10, 310, 340, 350, 410, 510, temperature assembly 20, and cables 18, 19, and 23 may be stored on shelf 33. A bottle 53 containing acoustic coupling fluid 54 may be stored in cabinet 31 on shelf 36. Thus, all components of the ultrasonic linear measurement system of the present invention can be contained in cabinet 31, which can be transported to the site where it is needed.

In operation, when it is desired to measure the perimeter of tank section 4, one wheels cabinet 31 to the location of tank section 4. One places ultrasonic assembly 10 in acoustic contact with the wall of tank section 4, as shown in FIG. 3. Temperature assemblies 20 (usually four) are placed in thermal contact with the wall of tank section 4.

When tank section 4 comprises 2219-T87 aluminum, wedges 50 preferably are approximately 2.070 inches long, 1.475 inches high, with an angle of 63.40° between surfaces 51 and 52, and may comprise part No. 57K0878 made by Stavely NDT Technologies; tranducers 14 and 15 are preferably 1 MHz transducers, such as part No. 57A8311 made by Stavely NDT Technologies; optimum acoustic coupling can be achieved by using demineralized water between wedges 50 and tank section 4, and heavy viscosity ultrasonic couplant between wedges 50 and transducers 14 and 15.

Figure 11:
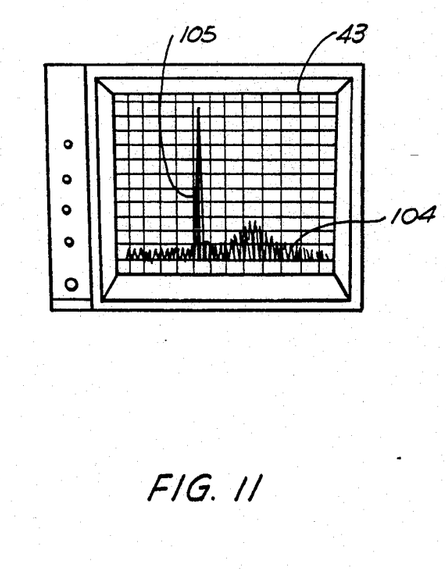
FIG. 11 shows a return waveform produced by the apparatus of the present invention.
Figure 12:
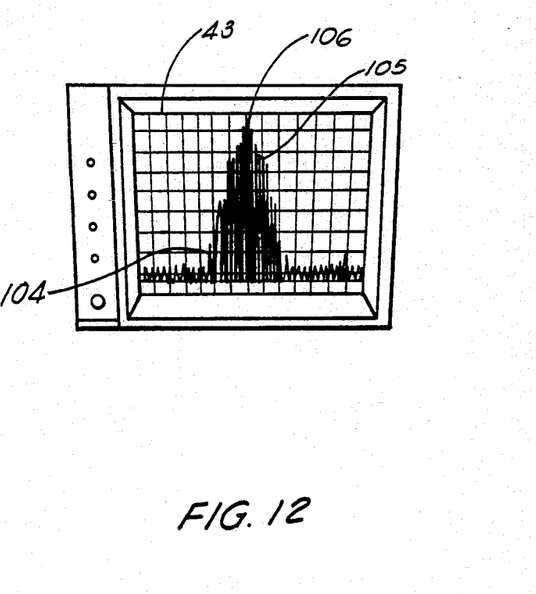
FIG. 12 shows the waveform of FIG. 11 displayed over a shorter time interval.
Figure 16:
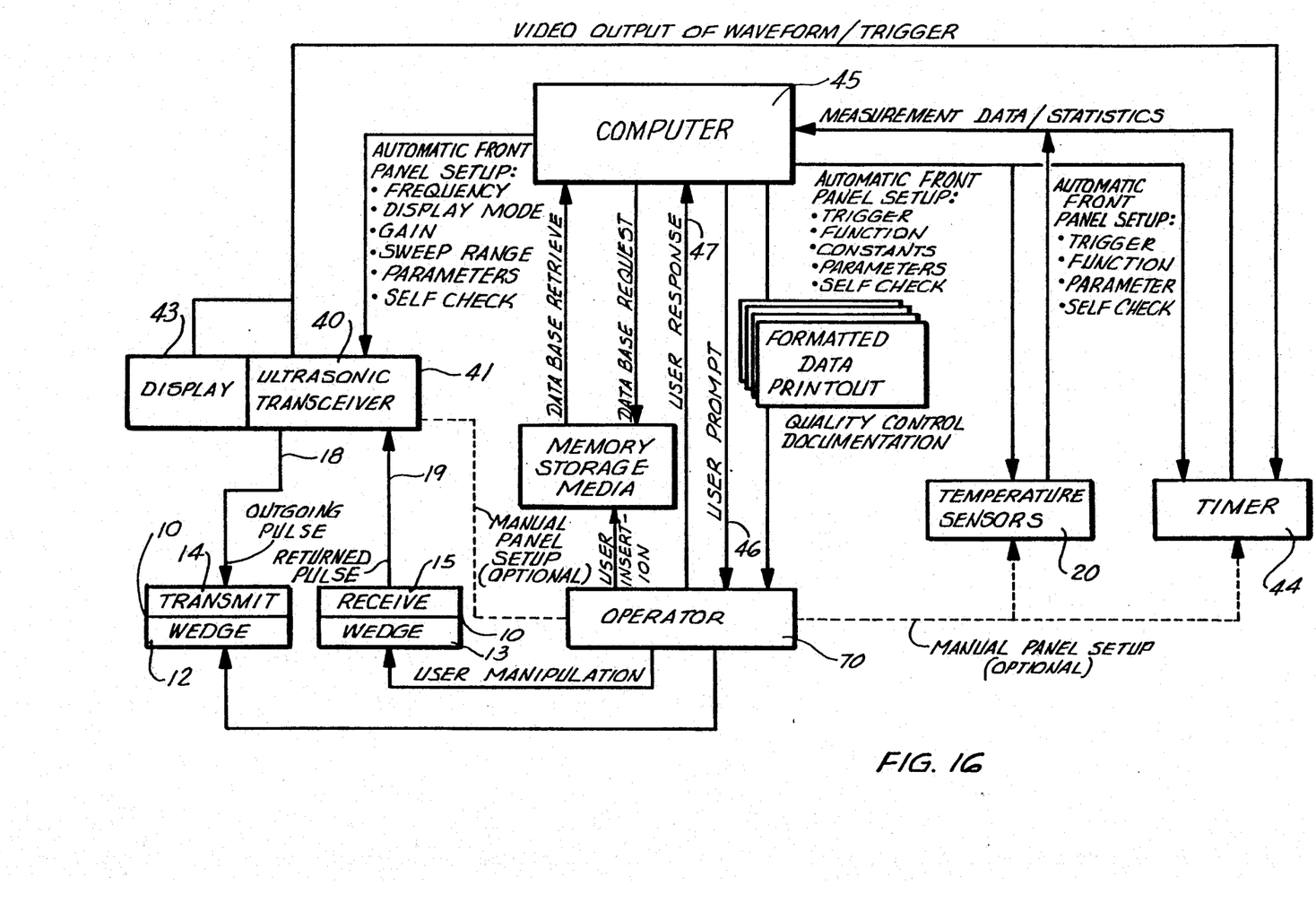
FIG. 16 is a schematic diagram showing the interconnection of various components of the system of the present invention.
Figure 17:
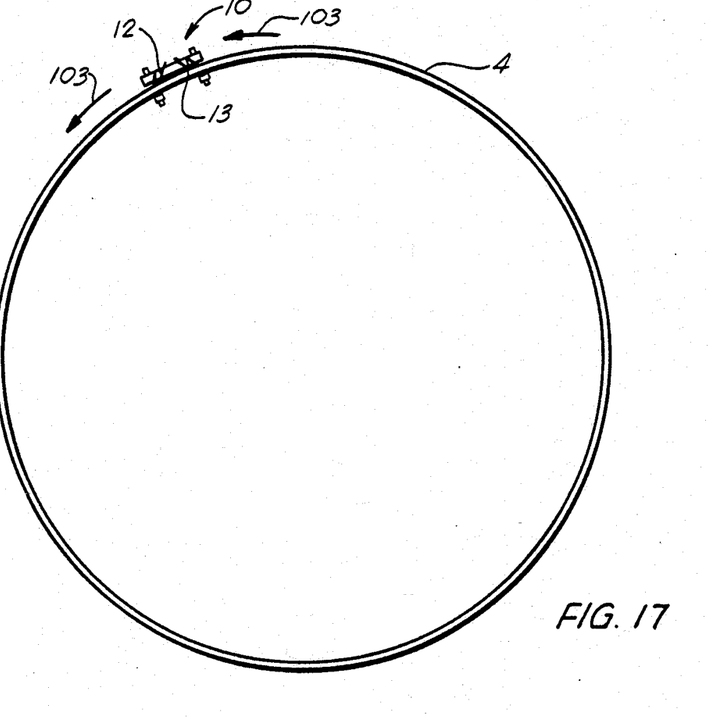
FIG. 17 shows the system of the present invention being used to measure the perimeter of an External Tank section.

Once assemblies 10 and 20 are placed in acoustic contact with the wall of tank section 4, an operator 70 (see FIG. 16) informs computer 45, via keyboard 47, to begin operations. The computer communicates with timer 44, data acquisition unit 48, and transceiver 40 to perform diagnostic testing of each individual unit and the entire system for proper operation. Computer 45 then communicates with each unit to load the proper front panel settings for the particular part number or test article under test. The sensors 20, 10, are then tested for proper operation. The average temperature is determined and printed. Computer 45 communicates with mainframe 41 of ultrasonic transceiver 40. Mainframe 41 causes ultrasonic transducer 14 to generate ultrasonic acoustic waves 100 (see FIG. 10) in wedge 12 and initiates timer 44 measurement through display output 43. Waves 100 may be either longitudinal or transverse. The relative orientation of first surface 51 and second surface 52 of wedge 50 is such that the ultrasonic waves 100 produce ultrasonic surface acoustic waves 101 on the surface of tank section 4 (as used herein, "surface acoustic waves" or "surface waves" shall be understood to describe both the theoretical Rayleigh surface wave and the practical Lamb waves associated with thin plates). Surface waves 101 travel on the surface of the wall of tank section 4 in the direction of arrows 103 (see FIGS. 10 and 18). When waves 101 reach wedge 13, they generate ultrasonic acoustic waves 102 in wedge 13. Ultrasonic waves 102 are detected by mainframe 41 through transducer 15. The relative strength of returning ultrasonic wave 102 is detected by transducer 15. It is conditioned and amplified by mainframe 41 and is displayed as waveform 104 on display 43 in the form of voltage (vertical) as a function of time (horizontal). Waveform 104, and specifically peak 106 (FIG. 12) of spike 105 (FIGS. 11 and 12) is used by timer 44 to determine the time of propagation of waves 100, 101, and 102 from transducer 14 to transducer 15.

Transducer 14 transmits a plurality of waves 100, adjacent waves 100 being spaced far enough apart in time such that a wave 102 corresponding to a first wave 100 generated by transducer 14 is detected by transducer 15 before the next wave 100 is transmitted by transducer 14.

The measurement program in computer 45 determines the constant for the speed of ultrasonic surface waves for the type of material making up tank section 4. It obtains a number of individual temperatures from data acquisition unit 48 (which received the temperatures from sensor 21 via cable 23) and calculates their average. It sets the correct signal level such that wave form 104 will be detectable by timer 44, based on the characteristics of the tank section 4 (approximate length and type of material) and the average temperature. It obtains a multiplicity of samples, for example one hundred, each sample consisting of the measured time interval between generation of wave 100 by ultrasonic transducer 14 and the receipt of wave 102 by ultrasonic transducer 15. It deletes out of range samples, and adjusts the measurement for temperature, shift and trigger point, distance between transducers 14 and 15 and other offsets and corrections. It then plots average temperature and average length, then it prints the time, signal strength, length, temperature, standard deviation, and number of samples used.

Detailed information about the software used in the present invention, including a copy of a program, can be found in Appendix A of U.S. Pat. No. 5,056,367. Detailed information about the hardware can be found in Appendix B of U.S. Pat. No. 5,056,367

Figure 18:
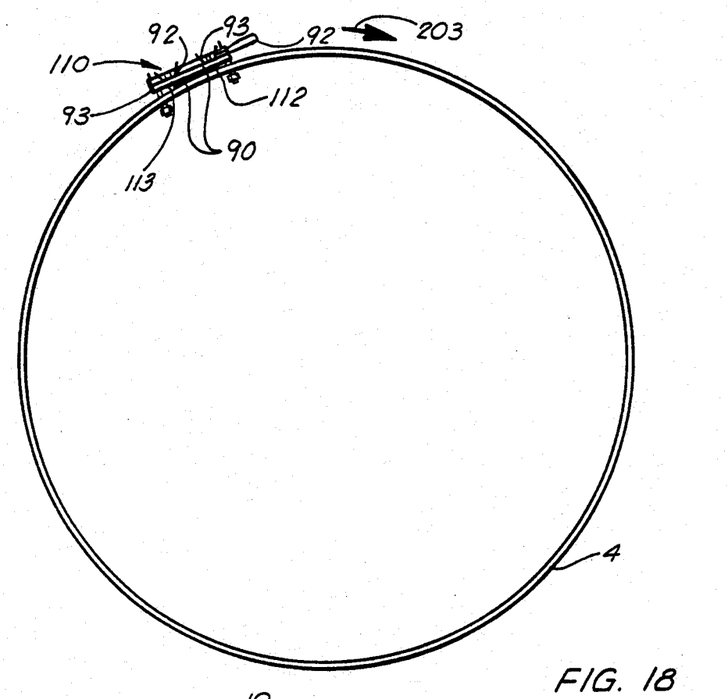
FIG. 18 is a view similar to FIG. 17 showing the system of an alternative embodiment of the present invention in use.
Figure 19:
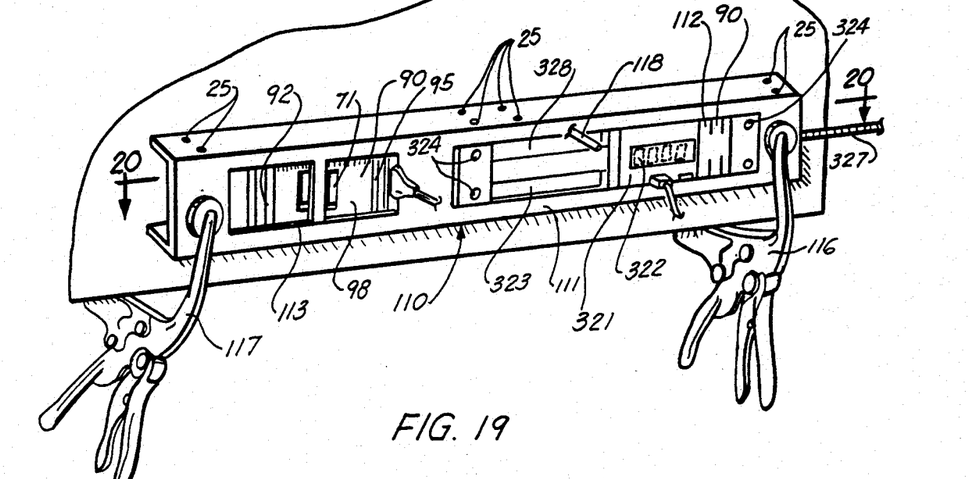
FIG. 19 is a perspective view of the sensor assembly shown in FIG. 18.
Figure 20:
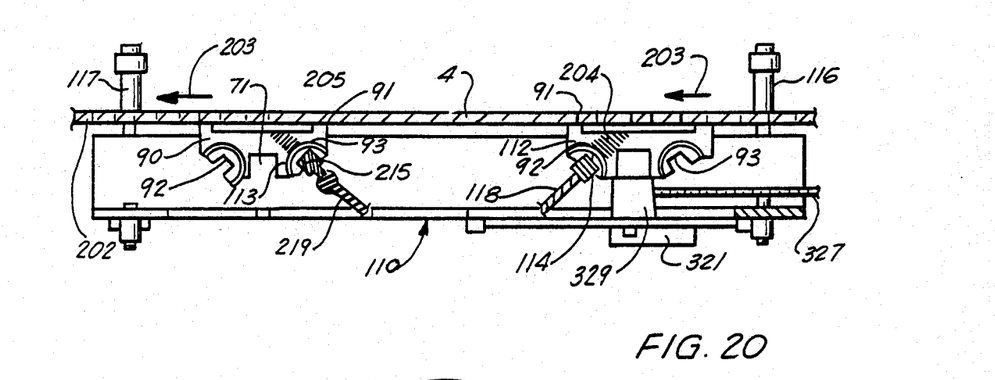
FIG. 20 is a cut-away view taken along lines 20-20 of FIG. 19.

FIGS. 18, 19, and 20 show a portable ultrasonic sensor assembly 110 which is similar to, and can be used instead of, portable ultrasonic sensor assembly 10. It can be used to determine the propagational velocity of, and to measure the perimeter of, a curvilinear body, such as tank section 4. Portable ultrasonic sensor assembly 110 is advantageous in that only the relative offsets of the wedges used need be known. Additionally, the velocity of surface waves on the surface of tank section 4 can be determined at the same time that the distance is being measured, as will become apparent shortly.

Transducers 114 and 215 (not shown in FIG. 18) are placed in acoustic contact with surfaces 92 and 93 of wedges 112 and 113 (each of which comprises a wedge 90 as shown in FIGS. 7 and 9), respectively. Wedges 112 and 113, which could alternatively comprise wedges 50, 60, or 80, are placed a predetermined distance apart. Wedge 113 is clamped to sensor housing 111 in the same manner that wedges 12 and 13 are clamped to sensor housing 11 and wedge 112 is attached to caliper head 321 through spacer 329. Wedges 112 and 113 and housing 111 are placed in acoustic contact with tank section 4 with clamps 116 and 117 with first surfaces 91 of wedges 112 and 113 in acoustic contact with the surface of tank section 4. Acoustic coupling fluid (preferably demineralized water) is used to acoustically couple surfaces 91 with the surface of tank section 4. The coupling fluid is preferably poured into reservoir 71 after wedges 112 and 113 are clamped to tank section 4. Surfaces 92 and 93 of wedge 112 are oriented relative to surface 91 of wedge 112 such that the signal strength of the ultrasonic waves is maximized. This can be done by trial and error by starting with surfaces 92 and 93 near the theoretically determined optimum angle with respect to surface 91 and varying the relative angles of surfaces 92 and 93 until the signal strength is at a maximum. This normally takes only a few moments. The same optimization technique is then performed using wedge 113. Optimization takes place by alternating between wedges 112 and 113 until no further optimization is necessary. The positions of wedges 112 and 113 are then locked to prohibit inadvertent movement during measurements. Offsets are entered into the computer.

Once the proper angle between surface 91 and each of surfaces 92 and 93 has been determined and locked in place, measurement of the perimeter of tank section 4 begins. An ultrasonic wave 205 is generated by ultrasonic transducer 215, which is in acoustic contact with third surface 93 of wedge 113. This ultrasonic wave travels through wedge 113 and generates a surface wave 202 on the surface of tank section 4. Surface wave 202 travels in the direction of arrow 203 to wedge 112, where it generates an ultrasonic wave 204 which travels through wedge 112 and is detected at surface 92 of wedge 112 by ultrasonic transducer 114, which is in acoustic contact therewith. Wedge 112 is then moved an incremental distance from wedge 113 by rotating rod 327 and the previous steps are repeated. This process takes place a multiplicity of times until the differential velocity measurements converge statistically within the required measurement tolerance. All the data is then statistically analyzed and corrected for relative lateral and angular position of the wedges. The velocity of surface waves on the surface of tank section 4 is calculated by statistically analyzing the incremental time intervals between transmission of the ultrasonic waves 205 in wedge 113 by transducer 215 and detection of the ultrasonic waves 204 in wedge 112 by ultrasonic transducer 114, and dividing the known, predetermined and incremental distances by that time interval.

The perimeter of tank section 4 is determined by measuring the time interval between transmission of the ultrasonic waves 205 in wedge 113 by transducer 215, and reception of wave 204 by transducer 114 in wedge 112, and multiplying that time interval by the experimentally determined velocity and correcting for certain other constants (such as distance between wedges 112 and 113).

Figures 22, 23:
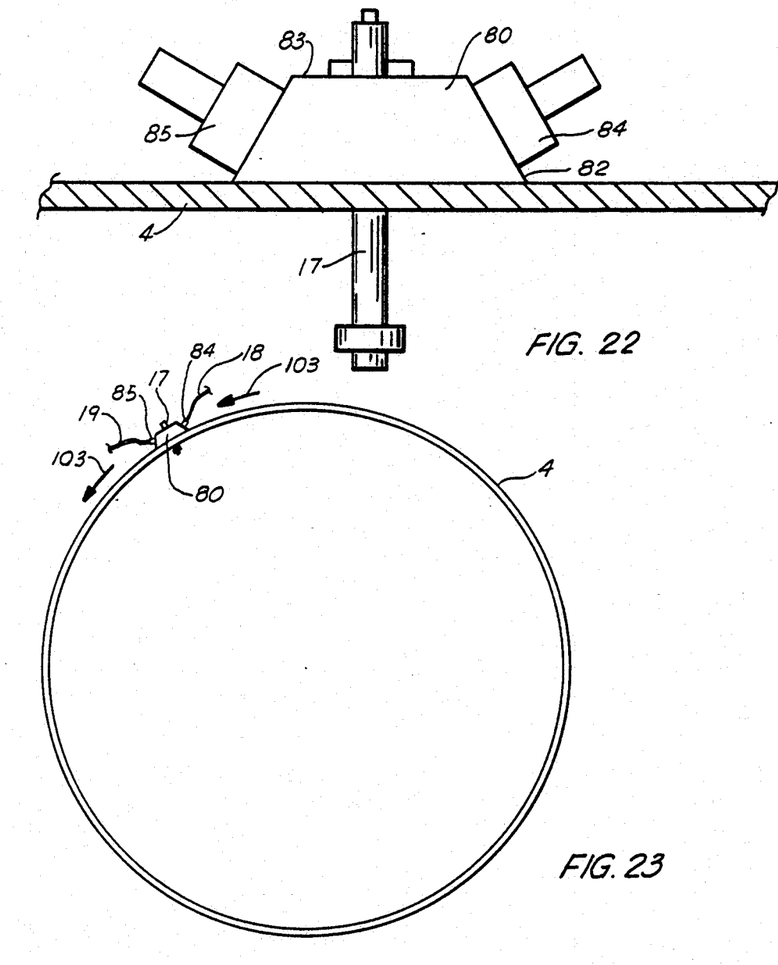
FIG. 22 is a side view of another embodiment of the sensor assembly of the present invention.
FIG. 23 is a an end view showing the sensor assembly of FIG. 22 in use.

One could use a wedge 80 (FIG. 8) or 90 (FIG. 9) without a sensor housing For example, one could attach cables 18 and 19 to ultrasonic transducers 84 and 85 (see FIGS. 22 and 23), respectively. A single wedge 80 would act as the transmitting and receiving wedge, the ultrasonic wave being generated at surface 82 and detected at surface 83. The wedge 80 could be placed in acoustic contact with a surface (such as tank section 4) whose perimeter is to be measured with one's hand or other mechanical means (such as clamp 17). The operation otherwise would be similar to the system using wedges 12 and 13.

Figure 21:
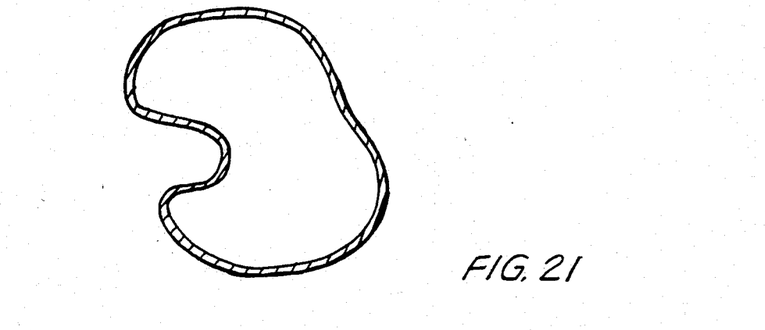
FIG. 21 is an end view of a curvilinear object whose perimeter can be measured with the system of the present invention.

A three-dimensional curvilinear body 210 is shown in end view in FIG. 21. One can readily see how difficult it would be to measure the perimeter of body 210 with a steel tape. Using the system of the present invention, the perimeter of body 210 can be measured as easily as that of tank section 4.

In view of the numerous modifications which could be made to the preferred embodiments disclosed herein without departing from the scope or spirit of the present invention, the details herein are to be interpreted as illustrative and not in a limiting sense.

What is claimed as invention is:

1. An apparatus for acoustically coupling an ultrasonic transducer with a body having a surface that tracks a generally circular path, and wherein surface waves are to be transmitted along the body surface following the generally circular path, the apparatus comprising:
   a wedge having:
   (a) a structural base having a first surface for acoustically contacting a subject surface area of a body to be measured, on which surface waves are to be transmitted;
   (b) a second surface for acoustically contacting an ultrasonic transucer, the second surface being movable relative to the first surface;
   (c) first orienting means, including a cylinder in which the second surface is present and which is movably disposed in a recess in a block in which the first surface is present, for orienting the first surface and the second surface relative to each other so that ultrasonic waves emitted by the ultrasonic transducer generate surface wave which travel on the subject surface area of the body when the ultrasonic transducer is in acoustic contact with the second surface and the first surface is in acoustic contact with the subject surface area of the body;
   (d) a third surface for acoustically contacting an ultrasonic transducer; and
   (e) second orienting means for orienting the third surface relative to the first surface such that ultrasonic waves emitted by a transucer when the transducer is in acoustic contact with the third surface generate surface waves which travel on the surface of the body in a direction opposite to that of surface waves generated by a transucer which is in acoustic contact with the second surface.

2. The apparatus of claim 1, further comprising:
   a coupling fluid between the wedge and the surface of the body; and
   reservoir means for storing coupling fluid in the wedge.

3. An apparatus for acoustically coupling an ultrasonic transducer with a body along whose surface waves are to be transmitted, the apparatus comprising:
   a wedge having:
   (a) a first surface for acoustically contacting a surface of a body along which surface waves are to be transmitted;
   (b) a second surface for acoustically contacting an ultrasonic transducer;
   (c) a third surface for acoustically contacting an ultrasonic transducer;
   (d) first orienting means for relatively orienting the first and second surfaces to each other and maintaining the relative orientation of the first and second surfaces to each other such that ultrasonic waves emitted by an ultrasonic transducer generate surface waves which travel on a surface of a body when the ultrasonic transducer is in acoustic contact with the second surface and the first surface is in acoustic contact with the surface of the body; and
   (e) second orienting means for orienting the third surface relative to the first surface such that ultrasonic waves emitted by an ultrasonic transducer when the transducer is in acoustic contact with the third surface generate surface waves which travel on the surface of the body in a direction opposite to the surface waves generated by an ultrasonic transducer which is in acoustic contact with the second surface.

4. The apparatus of claim 3, wherein:
the first orienting means includes a cylinder in which the second surface is present and which is movably disposed in a recess in a block in which the first surface is present, and
the second orienting means includes a cylinder in which the third surface is present and which is movably disposed in a recess in the block in which the first surface is present.

5. The apparatus of claim 3, further comprising:
a coupling fluid between the wedge and the surface of the body; and
reservoir means for storing coupling fluid in the wedge.

* * * * *